(12) United States Patent
Saito et al.

(10) Patent No.: US 12,735,110 B2
(45) Date of Patent: Sep. 15, 2026

(54) AUTOMOTIVE BODY SIDE STRUCTURE

(71) Applicant: JFE STEEL CORPORATION, Tokyo (JP)

(72) Inventors: Takanobu Saito, Tokyo (JP); Shotaro Tsuru, Hamamatsu (JP); Yoshitaka Kuriage, Hamamatsu (JP)

(73) Assignee: JFE STEEL CORPORATION, Tokyo (JP)

( * ) Notice: Subject to any disclaimer, the term of this patent is extended or adjusted under 35 U.S.C. 154(b) by 174 days.

(21) Appl. No.: 18/859,660

(22) PCT Filed: May 8, 2023

(86) PCT No.: PCT/JP2023/017312

§ 371 (c)(1),
(2) Date: Oct. 24, 2024

(87) PCT Pub. No.: WO2023/233930

PCT Pub. Date: Dec. 7, 2023

(65) Prior Publication Data

US 2025/0269904 A1 Aug. 28, 2025

(30) Foreign Application Priority Data

Jun. 3, 2022 (JP) ................................ 2022-090638

(51) Int. Cl.
*B62D 21/15* (2006.01)
*B60K 1/04* (2019.01)
(Continued)

(52) U.S. Cl.
CPC ............. *B62D 21/157* (2013.01); *B60K 1/04* (2013.01); *B62D 25/025* (2013.01);
(Continued)

(58) Field of Classification Search
CPC ............. B60K 1/04; B60K 2001/0438; B62D 21/157; B62D 25/025
(Continued)

(56) References Cited

U.S. PATENT DOCUMENTS 8,708,402 B2 * 4/2014 Saeki .................. B62D 21/157
180/68.5
2022/0153111 A1 5/2022 Tatsuwaki et al.

FOREIGN PATENT DOCUMENTS

FR 3069224 A1 * 1/2019 ......... B62D 25/2036
JP 2017-226353 A 12/2017
(Continued)

OTHER PUBLICATIONS

Jul. 21, 2025 Search Report issued in European Patent Application No. 23815691.3.
(Continued)

*Primary Examiner* — Jason S Daniels
(74) *Attorney, Agent, or Firm* — Oliff PLC

(57) ABSTRACT

An automotive body side structure includes: a side sill extending in a front-rear direction of a vehicle body at a vehicle outer side of the vehicle body in a vehicle width direction and including a side sill inner and a side sill outer joined at an upper end portion and a lower end portion in a vehicle height direction, the side sill inner having a groove shape opening toward vehicle outside in the vehicle width direction and including a top portion and vertical walls, and the side sill outer having a groove shape opening toward vehicle inside in the vehicle width direction; a battery pack disposed at a lower part of the vehicle body vehicle inside in the vehicle width direction relative to the side sill; and a floor cross member extending in the vehicle width direction above the side sill vehicle inside in the vehicle width direction.

4 Claims, 4 Drawing Sheets

(51) Int. Cl.
*B62D 25/02* (2006.01)
*B62D 25/20* (2006.01)

(52) U.S. Cl.
CPC .................... *B62D 25/2036* (2013.01); *B60K 2001/0438* (2013.01); *B60Y 2200/91* (2013.01); *B60Y 2306/01* (2013.01)

(58) Field of Classification Search
USPC ............................................ 296/187.12, 209
See application file for complete search history.

(56) References Cited

FOREIGN PATENT DOCUMENTS

| | | | |
|---|---|---|---|
| JP | 2020-82945 | A | 6/2020 |
| JP | 6734709 | B2 | 8/2020 |
| JP | 2021-30918 | A | 3/2021 |
| JP | 2022-81180 | A | 5/2022 |
| KR | 2013-0005871 | A | 1/2013 |

OTHER PUBLICATIONS

Jun. 27, 2023 Search Report issued in International Patent Application No. PCT/JP2023/017312.

* cited by examiner

5

VEHICLE WIDTH DIRECTION

VEHICLE LENGTH DIRECTION (a) EVALUATION POSITION OF DEFORMATION AMOUNT OF BATTERY

1

7

11

3a(3)

5

9

3b(3)

INPUT LOAD
(= REACTION FORCE)

13

VEHICLE WIDTH DIRECTION (b) INPUT LOAD TO BATTERY PACK (a) INVENTION EXAMPLE (b) COMPARATIVE EXAMPLE 1 (c) COMPARATIVE EXAMPLE 2

AUTOMOTIVE BODY SIDE STRUCTURE

FIELD

The present invention relates to an automotive body side structure such as a battery powered vehicle (battery electric vehicle) in which a battery pack is disposed vehicle inside in the vehicle width direction relative to a side sill.

BACKGROUND

In recent years, particularly in the automobile industry, replacement from a gasoline engine car due to environmental problems to a battery powered vehicle is in progress. In a battery powered vehicle or the like, a battery pack accommodating a large battery is disposed on a floor portion of a lower part of a vehicle body. Further, since a lithium (Li) based material is often used for the battery, when the battery pack is damaged at the time of a collision and liquid leakage from the battery occurs, there is a possibility of fire, and thus a structure for protecting the battery pack is required. The battery pack is protected by a floor cross member extending in the vehicle width direction and side sills extending in the vehicle length direction both outsides of the vehicle in the vehicle width direction, with the floor cross member displaced between the two side sills and the battery pack placed below the floor cross member.

As a technique for protecting a battery pack at the time of a side collision (side impact collision) of a battery powered vehicle or the like, for example, Patent Literature 1 discloses a structure in which, in a vehicle including a battery pack, a side sill extending in a front-rear direction of a vehicle body at an outer side in a vehicle width direction, and a floor cross member bridged between left and right side sills, both end portions of the floor cross member are connected to a joint portion between the side sill inner and the side sill outer from a vehicle inner side side portion of the side sill inner in the side sill.

CITATION LIST

Patent Literature

Patent Literature 1: JP 6734709 B

SUMMARY

Technical Problem

In the technique disclosed in Patent Literature 1, at the time of a side collision in which a load is input when a pole or the like collides with a side sill at a side face of the vehicle, the collision load is transferred from the side sill to the floor cross member via a connection portion between the side sill and the floor cross member extending from a vehicle inner side side portion of the side sill inner to a joint portion between the side sill outer and the side sill inner. The reaction force is amplified by the floor cross member to crush the side sill outer and the side sill inner, and the side sill outer and the side sill inner are crushed to compressive deformation to efficiently absorb the collision energy (crush energy). However, when the side sill is crushed first, the load transferred to the battery pack cannot be sufficiently reduced, and the battery pack cannot be sufficiently protected.

The present invention has been made to solve the above problems, and an object thereof is to provide an automotive body side structure capable of protecting a battery pack by reducing a load transferred to the battery pack at a time of a side collision of a vehicle body at a time of a side collision of the vehicle body, the automotive body side structure including a side sill, a battery pack disposed vehicle inside in a vehicle width direction relative to the side sill, and a floor cross member.

Solution to Problem

An automotive body side structure according to the present invention includes: a side sill formed by joining a side sill inner and a side sill outer extending in a front-rear direction of a vehicle body at a vehicle outer side in the vehicle width direction of the vehicle body at an upper end portion and a lower end portion in a vehicle height direction; a battery pack disposed at a lower part of the vehicle body vehicle inside in the vehicle width direction relative to the side sill; and a floor cross member extending in the vehicle width direction above the side sill vehicle inside in the vehicle width direction, wherein the floor cross member is made of a metal sheet having a tensile strength of 1180 MPa-class or more, and includes a vehicle outer side end portion in the vehicle width direction not contacting a vehicle inner side face of the side sill inner in the vehicle width direction, the end portion being disposed so as to cover an upper portion of the side sill inner in the vehicle height direction, the end portion extending to and contacting a joining surface portion at the upper end portion of the side sill inner and the side sill outer, and wherein at a time of a side collision in which a collision load is input to the side sill from vehicle outside in the vehicle width direction, a load transferred to the battery pack is reduced by transferring a load input to the side sill to the floor cross member after the side sill outer is deformed and crushed.

The floor cross member may have a groove shape extending in the vehicle width direction, a wall face portion contacting the joining surface portion may be provided at a distal end of the floor cross member, and a groove shape of an end portion of the floor cross member may be closed by the wall face portion.

The end portion of the floor cross member may be connected to the joining surface portion between the side sill inner and the side sill outer.

Advantageous Effects of Invention

In the present invention, the floor cross member has a load transfer path of a load input to the vehicle body at the time of a side collision, and a reaction force to vehicle outside in the vehicle width direction by the floor cross member is mainly applied to a joining surface portion where the side sill inner and the side sill outer are joined. As a result, the side sill outer is crushed to compressive deformation to absorb collision energy, but the form of the side sill inner can be maintained without being crushed. Further, since the floor cross member is made of a metal sheet having a tensile strength of 1180 MPa or more, even after the side sill outer is compressed and deformed and crushed, the load input to the side sill can be continuously received without deforming the floor cross member. As a result, the side sill inner is hardly deformed and crushed, and the collision energy absorption capacity (impact energy absorption capacity) can be maintained, so that the load transfer to a battery pack 5 can be reduced. As a result, deformation of the battery pack

5 can be suppressed at the time of a side collision, the battery pack can be protected from damage, and a safe vehicle can be made.

DESCRIPTION OF EMBODIMENTS

Figure 1:
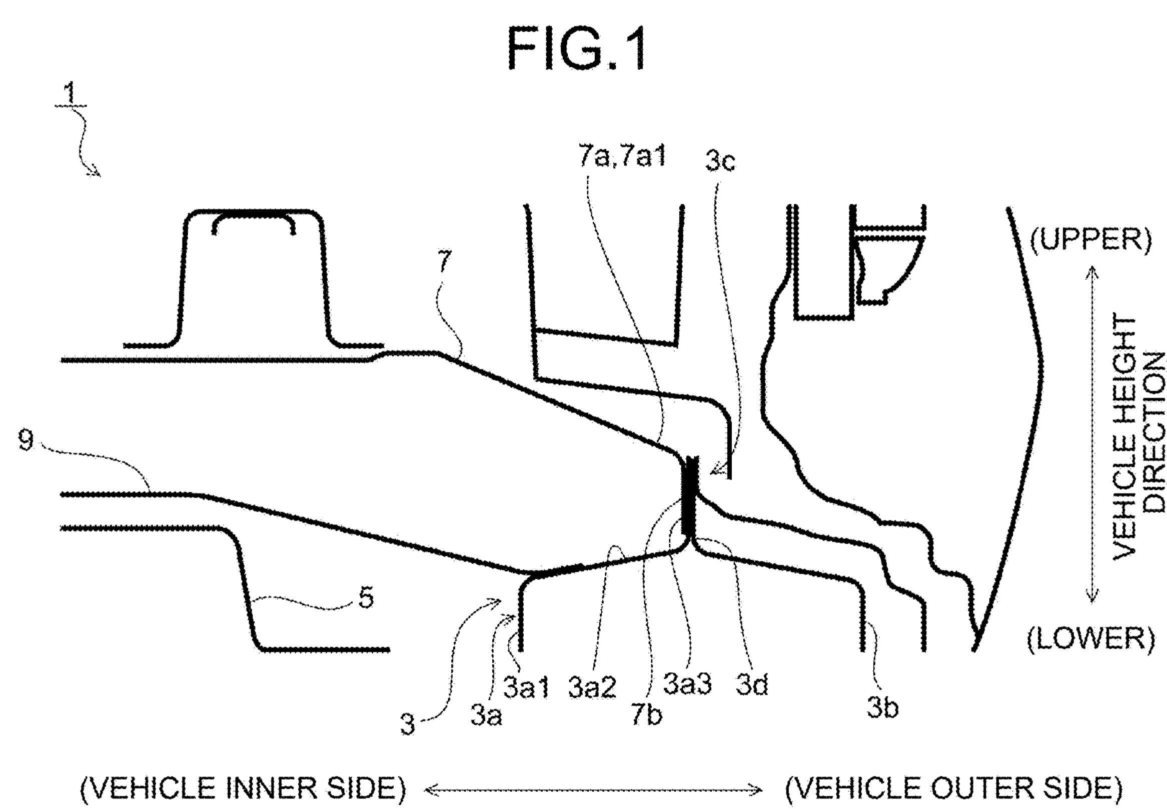
FIG. 1 is a diagram illustrating an automotive body side structure according to an embodiment of the present invention.

As illustrated in FIG. 1 as an example, an automotive body side structure 1 according to the embodiment of the present invention includes a side sill 3, a battery pack 5, a floor cross member 7, and a floor panel 9.

Hereinafter, an automotive body side structure 1 according to the present embodiment will be described with reference to FIG. 1. FIG. 1 illustrates other vehicle body components such as a floor panel 9 disposed above the battery pack 5. However, in the following description, these vehicle body components are not essential parts of the present invention, and thus the description thereof is omitted. Furthermore, in the present specification and the drawings, elements having the same functional configuration are denoted by the same reference numerals, and redundant description will be omitted.

As illustrated in FIG. 1, the side sill 3 includes a side sill inner **3*a* and a side sill outer 3*b* extending in the front-rear direction of the vehicle body at the vehicle outer side of the vehicle body in the vehicle width direction. The side sill inner 3*a* has a groove shape opened toward vehicle outside in the vehicle width direction by a top portion 3*a*1 and the pair of side walls 3*a*2, and the side sill outer 3*b* has a groove shape opened toward vehicle inside in the vehicle width direction. The side sill inner 3*a* and the side sill outer 3*b* are joined to each other at an upper end portion 3*c*** and a lower end portion (not illustrated) in the vehicle height direction with their openings facing each other to form a closed cross section structure.

The automotive body side structure 1 illustrated in FIG. 1 illustrates a range of about ⅓ or more of the upper part of the side sill 3 in the vehicle height direction. The side sill inner **3*a* and the side sill outer 3*b* have, for example, a hat-shaped cross-sectional shape including a top portion, a pair of side walls (vertical walls), and a pair of flange portions, and flange portions at an upper end portion and a lower end portion of the side sill inner 3*a* and the side sill outer 3*b* are joined to each other to form the side sill 3** having a closed cross section structure. However, in the present invention, the side sill inner and the side sill outer are not limited to those having the hat-shaped cross-sectional shape, and it is sufficient that the upper end portion and the lower end portion of each of the side sill inner and the side sill outer are joined to constitute a side sill having a closed cross section structure.

As illustrated in FIG. 1, the battery pack 5 is disposed at a lower part of the vehicle body vehicle inside in the vehicle width direction relative to the side sill 3, and a battery cell (not illustrated) is mounted inside the battery pack 5.

The floor cross member 7 has a hat-shaped cross-sectional shape including a bottom surface (bottom portion), a pair of side walls, and a pair of flange portions, and has a groove shape extending in the vehicle width direction by the bottom surface and the pair of side walls. As illustrated in FIG. 1, the floor cross member 7 extends in the vehicle width direction above the side sill 3 vehicle inside in the vehicle width direction. In the cross-sectional view of the automotive body side structure of FIG. 1, a cross section of the bottom surface is displayed. The floor cross member 7 is made of a metal sheet having a tensile strength of 1180 MPa-class or more. The vehicle outer side end portion **7*a* in the vehicle width direction is disposed so as not to contact the vehicle inner side face of the side sill inner 3*a* in the vehicle width direction but to cover the upper portion of the side sill inner 3*a* in the vehicle height direction. Further, the end portion extends to a joining surface portion 3*d* where the side sill inner 3*a* and the side sill outer 3*b* are joined and contact them. The upper portion of the side sill inner 3*a* in the vehicle height direction refers to a side wall 3*a*2 in a case where the side sill inner 3*a* has a hat-shaped cross-sectional shape including a top portion 3*a*1, a side wall 3*a*2, and a flange portion 3*a*3 as illustrated in FIG. 1. The vehicle inner side face of the side sill inner 3*a* in the vehicle width direction refers to a top portion 3*a*1**.

In the automotive body side structure 1, the side sill outer **3*b* is compressed and deformed and crushed by the collision load input to the side sill 3 at a time of a side collision in which the collision load is input to the side sill 3 from vehicle outside in the vehicle width direction. After the side sill outer 3*b* is crushed, the load transferred to the battery pack 5 is reduced by continuously receiving the load input to the side sill 3 without deforming the floor cross member 7**.

Figure 2:
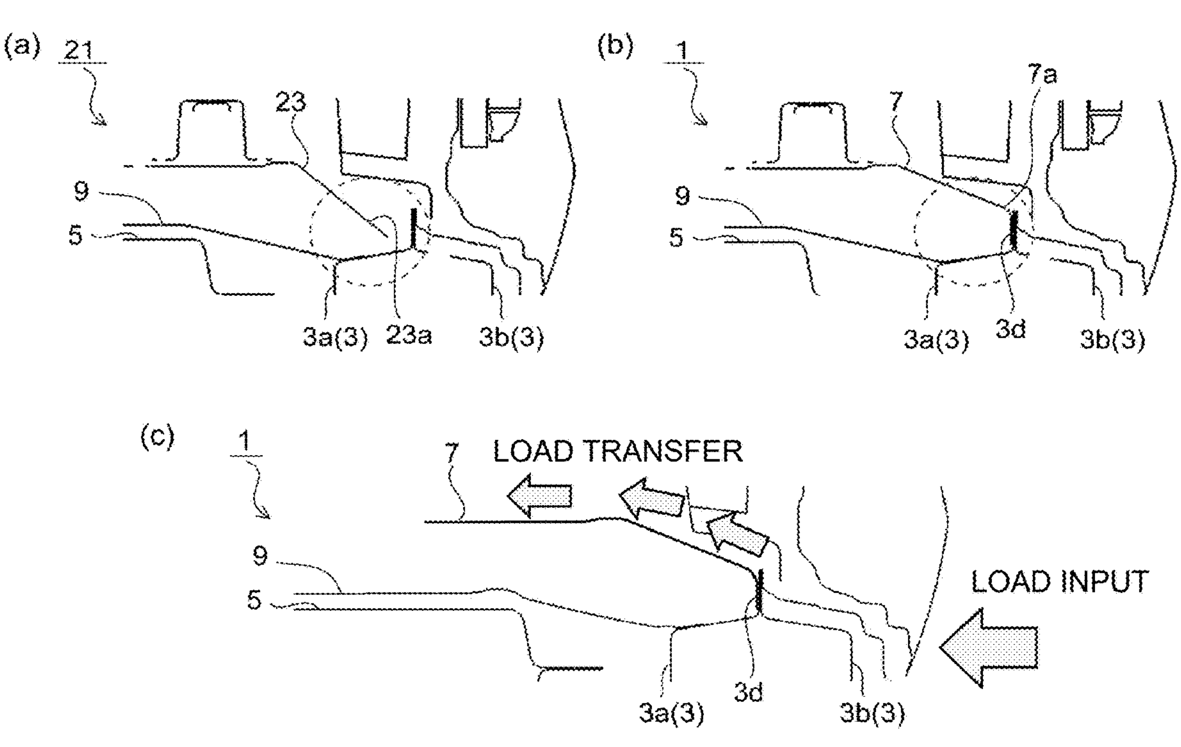
FIG. 2 is a view for describing transfer of a load at the time of a side collision in the automotive body side structure according to the embodiment of the present invention ((a) Conventional automotive body side structure, (b) automotive body side structure according to present embodiment, and (c) Load transfer path at the time of side collision).

The operation and effect of the automotive body side structure 1 according to the present embodiment is as follows. In a conventional automotive body side structure 21 including the side sill 3, the battery pack 5, and a floor cross member 23 as illustrated in FIG. 2(*a*) as an example, an end portion **23*a* of the floor cross member 23 in the vehicle width direction extends to the upper side of the side sill inner 3*a*, but is not in contact with the joining surface portion 3*d*** of the upper end portion 3*c* of the side sill 3. Therefore, in a case where a load is input to the side sill 3 at the time of a side collision, first, the side sill outer 3*b* is deformed and crushed, and then the load is not sufficiently transferred to the floor cross member 23, and the load transfer to the battery pack 5 cannot be sufficiently reduced.

On the other hand, according to the automotive body side structure 1 of the present embodiment, as illustrated in FIGS. 1 and 2(*b*), the end portion 7*a* of the floor cross member 7 is in contact with the joining surface portion 3*d* of the upper end portion 3*c* of the side sill 3, so that the floor cross member 7 has a load transfer path of the load input to the vehicle body at the time of the side collision as illustrated in FIG. 2(*c*). The reaction force toward vehicle outside in the vehicle width direction by the floor cross member 7 is mainly applied to the joining surface portion 3*d* where the side sill inner 3*a* and the side sill outer 3*b* are joined. As a result, the side sill outer 3*b* is crushed to compressive deformation to absorb collision energy, but the form of the side sill inner 3*a* can be maintained without being crushed. Further, since the floor cross member 7 is made of a metal sheet having a tensile strength of 1180 MPa or more, even after the side sill outer 3*b* is compressed and deformed and crushed, the load input to the side sill 3 can be continuously received without deforming the floor cross member 7. As a result, the side sill inner is hardly deformed and crushed, and the collision energy absorption capacity can be maintained, so that the load transfer to the battery pack 5 can be reduced. As a result, deformation of the battery pack 5 can be suppressed at the time of a side collision, the battery pack 5 can be protected from damage, and a safe vehicle can be made.

In the present embodiment, the floor cross member 7 is made of a metal sheet having a tensile strength of 1180 MPa-class or more. However, in a case where the floor cross member 7 is made of a metal sheet having a tensile strength of less than 1180 MPa, the floor cross member 7 is easily deformed when a load is transferred to the floor cross member, the load cannot be sufficiently transferred, and the load transferred to the battery pack 5 cannot be reduced.

Therefore, in the present embodiment, the floor cross member 7 is made of a metal sheet having a tensile strength of 1180 MPa-class or more, and specifically, steel sheets having tensile strengths of 1180 MPa-class, 1370 MPa-class, 1470 MPa-class, and 1760 MPa-class are exemplified.

In the automotive body side structure 1, the end portion 7*a* of the floor cross member 7 contacts the joining surface portion 3*d* where the side sill inner 3*a* and the side sill outer 3*b* are joined, but is not connected. However, in the present invention, the end portion of the floor cross member is preferably connected to the joining surface portion between the side sill inner and the side sill outer. Accordingly, at a time of a side collision, the end portion of the floor cross member and the joining surface portion between the side sill inner and the side sill outer are less likely to be displaced from each other, and the load transfer path of the load input to the vehicle body (side sill) to the floor cross member can be maintained, so that the load can be more easily transferred to the floor cross member, and the load transferred to the battery pack can be further reduced.

Further, in the present invention, it is preferable that the floor cross member 7 has a groove shape (not illustrated) which includes a bottom surface and a pair of side walls and extends in the vehicle width direction, and for example, as illustrated in FIG. 1, a wall face portion 7*b* which is bent from a bottom surface 7*a* and continues is provided at a distal end of the end portion 7*a*, and the groove shape of the end portion 7*a* of the floor cross member 7 is closed by a wall face portion 7*b*. As a result, the end portion 7*a* of the floor cross member 7 is hardly crushed, and the vehicle body can be prevented from being greatly deformed.

Figure 3:
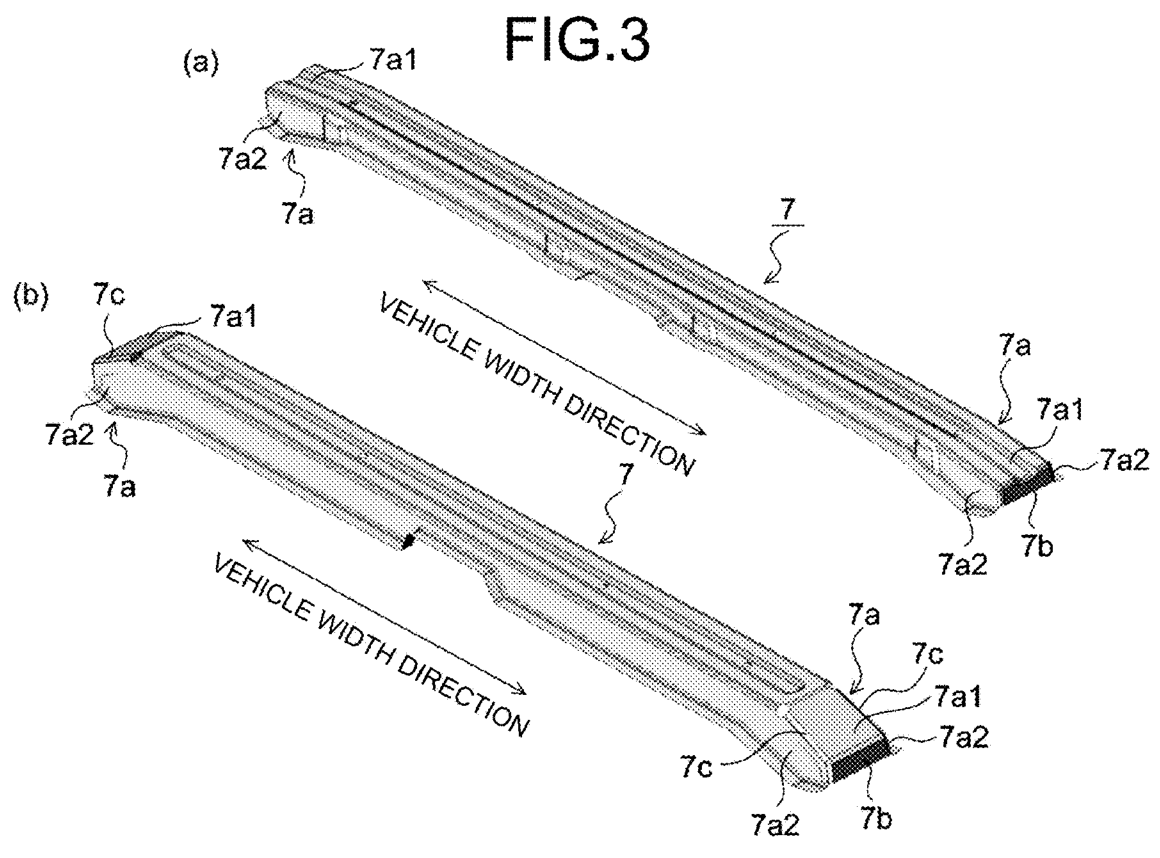
FIG. 3 is a diagram illustrating a specific example of a shape in which an end portion of a floor cross member is closed in the side structure of the vehicle body according to the embodiment of the present invention.

A specific example of a shape in which the groove shape is closed at the end portion 7*a* of the floor cross member 7 in the vehicle width direction is illustrated in FIG. 3. In the floor cross member 7 illustrated in FIG. 3(*a*), a bottom surface 7*a*1, a pair of side walls 7*a*2, and a wall face portion 7*b* are integrated and continuous at the distal end of the end portion 7*a*, so that the groove shape is a closed shape. Since the floor cross member 7 illustrated in FIG. 3(*b*) has a high side wall height (height in the vehicle height direction), the groove-shaped bottom surface 7*a*1 and the wall face portion 7*b* at the distal end are bent and continuous, but the groove-shaped bottom surface 7*a*1 and the pair of side walls 7*a*2 are not integrated and continuous. However, a welding margin 7*c* bent toward the side wall 7*a*2 is provided on both side portions of the bottom surface 7*a*1 and the wall face portion 7*b*, and the welding margin 7*c* and the side wall 7*a*2 are joined by spot welding or the like, so that the groove shape is a closed shape.

EXAMPLES

Since a specific analysis for verifying the operation and effect of the automotive body side structure according to the present invention was performed, the results thereof will be described below.

Figure 4:
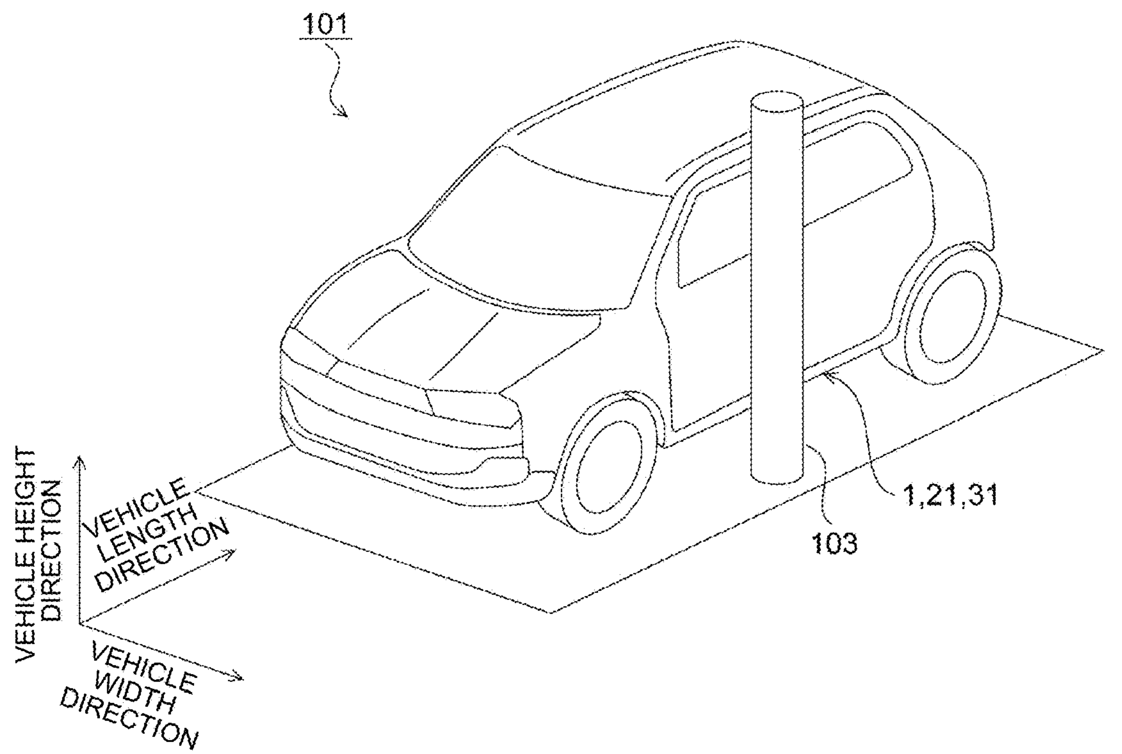
FIG. 4 is a diagram for describing a side collision of a vehicle body to be analyzed in the example.
Figures 5, 6:
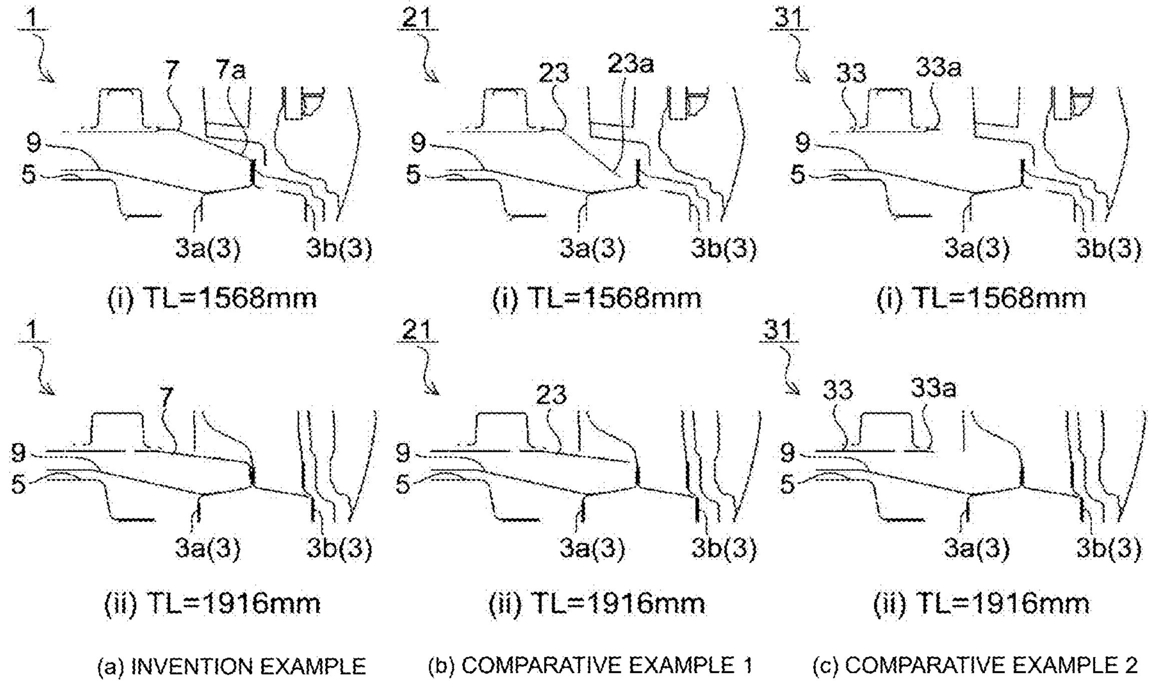
FIG. 5 is a diagram illustrating a deformation amount of a battery pack and a method of evaluating an input load to the battery pack in an example ((a) Evaluation position of deformation amount of battery pack, (b) Input load to battery pack).
FIG. 6 is a cross-sectional view of the automotive body side structure according to the Invention Example and Comparative Examples 1 and 2 in the example at (i) the vehicle length direction position TL=1568 mm and (ii) the vehicle length direction position TL=1916 mm ((a) Invention Example, (b) Comparative Example 1, (c) Comparative Example 2).

In the present example, side collision analysis (side impact analysis) in which a pole 103 collide from vehicle outside in the vehicle width direction as illustrated in FIG. 4 was performed on a vehicle 101 including the automotive body side structure 1 (Invention Example) including the side sill 3, the battery pack 5, and the floor cross member 7 illustrated in FIG. 1 in the above-described embodiment. In addition, in the automotive body side structure 1 according to the present example, as illustrated in FIG. 5(*b*), the battery pack 5 is supported by a battery frame assembly 11 disposed on the outer peripheral side in the vehicle width direction. As illustrated in FIG. 5(*b*), the battery frame assembly 11 includes a plurality of steel sheet parts.

In the side collision analysis, the vehicle 101 was accelerated to 29 km/h in the vehicle width direction, and collided with the pole 103 which is a rigid body with respect to the side face of the vehicle 101. The pole collision position at which the pole 103 collides with the vehicle 101 was set to a vehicle length direction position TL=1916 mm. When the pole 103 collides with the side sill 3 disposed at the side face of the vehicle 101, the side sill 3 (see FIG. 1) is locally deformed and advances inside the vehicle. Therefore, in the present example, the deformation amount of the battery pack 5 in the side collision process and the load input to the battery pack 5 were evaluated.

As for the deformation amount of the battery pack 5, as illustrated in FIG. 5(*a*), lengths in the vehicle width direction of the battery pack 5 before and after deformation were measured at a plurality of positions in the vehicle length direction (positions indicated by arrows in FIG. 5(*a*)), and a difference between before and after deformation was obtained. On the other hand, with respect to the load input to the battery pack 5, as illustrated in FIG. 5(*b*), in the collision process, the reaction force (contact reaction force) generated in the battery frame assembly 11 by the contact of a connecting member 13 provided on the outer peripheral side in the vehicle width direction of the battery frame assembly 11 was obtained.

Furthermore, in the present example, as a comparison target, side collision analysis of the vehicle illustrated in FIG. 4 was also performed on an automotive body side structure 21 (Comparative Example 1) illustrated in FIG. 6(*b*) and an automotive body side structure 31 (Comparative Example 2) illustrated in FIG. 6(*c*), as in the Invention Example, and the deformation amount of the battery pack 5 in the side collision process and the load input to the battery pack 5 were evaluated.

In the automotive body side structure 21 according to Comparative Example 1, an end portion 23*a* of the floor cross member 23 in the vehicle width direction extends so as to cover the side sill inner 3*a*, but does not contact the joining surface portion 3*d* between the side sill inner 3*a* and the side sill outer 3*b*.

In the automotive body side structure 31 according to Comparative Example 2, an end portion 33*a* of the floor cross member 33 in the vehicle width direction does not extend above the side sill inner 3*a*.

As for the load input to the battery pack 5 in Comparative Example 1 and Comparative Example 2, the contact reaction force between the connecting member 13 and the battery frame assembly 11 was obtained in the same manner as in the Invention Example.

Figure 7:
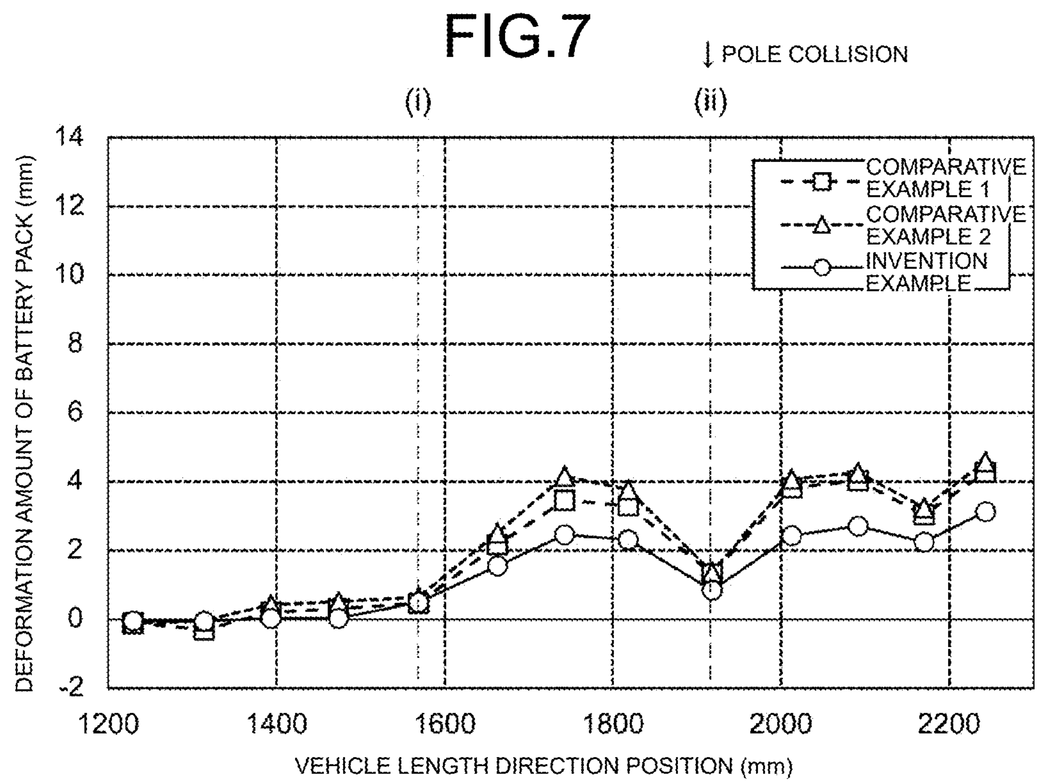
FIG. 7 is a graph illustrating a result of a deformation amount of the battery pack in a case where a pole collides with a vehicle length direction position TL=1916 mm in the example.

FIG. 7 illustrates the result of the deformation amount of the battery pack 5 at a time of a side collision in which the pole collision position is the vehicle length direction position TL=1916 mm in the Invention Example, the Comparative Example 1, and the Comparative Example 2. As illustrated in FIG. 7, the deformation amount of the battery pack 5 in the Invention Example and the Comparative Example 1 was smaller than that in the Comparative Example 2 in which the end portion 33*a* of the floor cross member 33 did not extend above the side sill inner 3*a*. Further, comparing the Invention Example with Comparative Example 1, the deformation amount of the battery pack 5 was smaller in the Invention Example.

Figure 8:
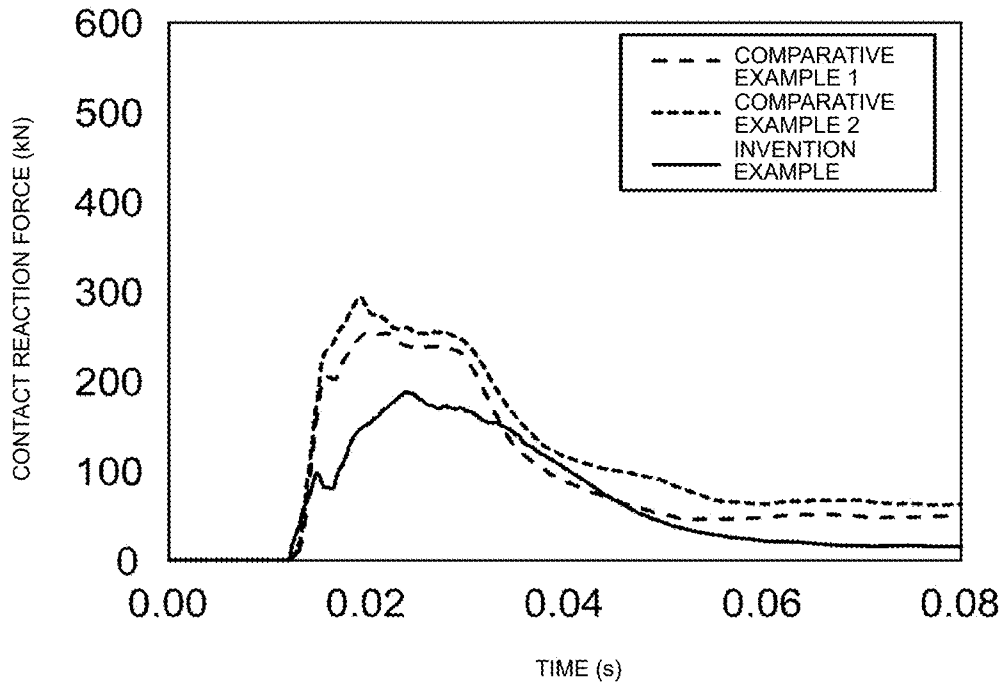
FIG. 8 is a graph illustrating a result of a contact reaction force obtained as an input load to the battery pack when a pole collides with a vehicle length direction position TL=1916 mm in the example.

FIG. 8 illustrates the result of contact reaction force obtained as a load to be input to the battery pack 5 at a time of a side collision where the pole collision position is set to the vehicle length direction position TL=1916 mm in the Invention Example, the Comparative Example 1, and the Conventional Example 2. As illustrated in FIG. 8, the load input to the battery pack 5 in the Invention Example and the Comparative Example 1 was smaller than that in the Comparative Example 2 in which the end portion 33*a* of the floor cross member 33 did not extend above the side sill inner 3*a*. Further, comparing the Invention Example with Comparative Example 1, the load input to the battery pack 5 was smaller in the Invention Example.

As described above, according to the automotive body side structure according to the present invention, the load input to the vehicle is transferred to the floor cross member at a time of a side collision, so that the load input to the battery pack can be sufficiently reduced, the deformation amount of the battery pack can be reduced, and the battery pack can be protected.

INDUSTRIAL APPLICABILITY

According to the present invention, it is possible to provide an automotive body side structure capable of protecting a battery pack by reducing a load transferred to the battery pack at a time of a side collision of a vehicle body at a time of a side collision of the vehicle body at a time of a side collision of the vehicle body, the automotive body side structure including the side sill, the battery pack disposed vehicle inside in the vehicle width direction of the side sill, and the floor cross member.

REFERENCE SIGNS LIST

1 AUTOMOTIVE BODY SIDE STRUCTURE
3 SIDE SILL
3*a* SIDE SILL INNER
3*a*1 TOP PORTION (SIDE FACE)
3*a*2 SIDE WALL (UPPER PORTION)
3*a*3 FLANGE PORTION
3*b* SIDE SILL OUTER
3*c* UPPER END PORTION
3*d* JOINING SURFACE PORTION
5 BATTERY PACK
7 FLOOR CROSS MEMBER
7*a* END PORTION
7*a*1 BOTTOM SURFACE
7*a*2 SIDE WALL
7*b* WALL FACE PORTION
7*c* WELDING MARGIN
9 FLOOR PANEL
11 BATTERY FRAME ASSEMBLY
13 CONNECTING MEMBER
21 AUTOMOTIVE BODY SIDE STRUCTURE
23 FLOOR CROSS MEMBER
23*a* END PORTION
31 AUTOMOTIVE BODY SIDE STRUCTURE
33 FLOOR CROSS MEMBER
33*a* END PORTION

The invention claimed is:

1. An automotive body side structure comprising:
a side sill extending in a front-rear direction of a vehicle body at a vehicle outer side of the vehicle body in a vehicle width direction and including a side sill inner and a side sill outer joined at an upper end portion and a lower end portion in a vehicle height direction, the side sill inner having a groove shape opening toward vehicle outside in the vehicle width direction and including a top portion and a pair of vertical walls, and the side sill outer having a groove shape opening toward vehicle inside in the vehicle width direction;
a battery pack disposed at a lower part of the vehicle body vehicle inside in the vehicle width direction relative to the side sill; and
a floor cross member extending in the vehicle width direction above the side sill vehicle inside in the vehicle width direction, wherein
the floor cross member is made of a metal plate having a tensile strength of 1180 MPa-class or higher, and includes a vehicle outer side end portion in the vehicle width direction not contacting the top portion that is a vehicle inner side face of the side sill inner in the vehicle width direction, the end portion being disposed so as to cover an upper portion of the side sill inner in the vehicle height direction, the end portion extending to and contacting a joining surface portion at the upper end portion of the side sill inner and the side sill outer.

2. The automotive body side structure according to claim 1, wherein the floor cross member has a groove shape extending in the vehicle width direction, a wall face portion contacting the joining surface portion is provided at a distal end of the floor cross member, and a groove shape of an end portion of the floor cross member is closed by the wall face portion.

3. The automotive body side structure according to claim 1, wherein the end portion of the floor cross member is connected to the joining surface portion between the side sill inner and the side sill outer.

4. The automotive body side structure according to claim 2, wherein the end portion of the floor cross member is connected to the joining surface portion between the side sill inner and the side sill outer.

* * * * *